United States Patent [19]

Tibbetts et al.

[11] Patent Number: 4,565,684
[45] Date of Patent: Jan. 21, 1986

[54] REGULATION OF PYROLYSIS METHANE CONCENTRATION IN THE MANUFACTURE OF GRAPHITE FIBERS

[75] Inventors: Gary G. Tibbetts, Birmingham; Michael G. Devour, Detroit, both of Mich.

[73] Assignee: General Motors Corporation, Detroit, Mich.

[21] Appl. No.: 685,046

[22] Filed: Dec. 21, 1984

Related U.S. Application Data

[63] Continuation-in-part of Ser. No. 642,574, Aug. 20, 1984, abandoned.

[51] Int. Cl.$^4$ .......................... C01B 31/04; D01F 9/12
[52] U.S. Cl. .................................. 423/447.3; 423/448; 423/458
[58] Field of Search ................ 423/447.3, 448, 458

[56] References Cited

U.S. PATENT DOCUMENTS

| | | | |
|---|---|---|---|
| 2,796,331 | 6/1957 | Kauffman | 423/448 |
| 3,378,345 | 4/1968 | Bourdean | 423/447.3 |
| 3,664,813 | 5/1972 | Hollander | 423/447.3 |
| 4,014,980 | 3/1977 | Fujimaki | 423/447.3 |
| 4,391,787 | 7/1983 | Tibbetts | 423/447.3 |

FOREIGN PATENT DOCUMENTS 0056004 1/1982 European Pat. Off. .

OTHER PUBLICATIONS

Onuma et al., "Carbon Fibers Obtained by Thermal Decomposition of Vaporized Hydrocarbons", *Oyo Butsuri*, vol. 32, No. 11, pp. 857–863, (1963).
Endo et al., "Growth Mechanism and Some Properties of Vapor–Grown Carbon Fibers", *Solid State Physics*, vol. 12, No. 1, pp. 1–12, Jan. 1977.
Baker et al., "The Formation of Filamentous Carbon", *Chemistry & Physics of Carbon*, vol. 14, pp. 83–165, (1978).
Koyama et al., *Japanese Journal of Applied Physics*, vol. 11, No. 4, Apr. 1972.
Oberlin et al., Journal of Crystal Growth, vol. 32, pp. 335–349, (1976).
Katsuki et al., *Carbon*, vol. 19, pp. 148–150, (1981).

*Primary Examiner*—John F. Niebling
*Attorney, Agent, or Firm*—Douglas D. Fekete

[57] ABSTRACT

In a preferred embodiment, graphite fibers are grown on a suitably nucleated ceramic surface by passing a methane gas stream over the surface at an elevated temperature. Initially, the methane concentration in the gas stream is adjusted to between 5 and 15 volume percent to form microscopic carbon filaments. Thereafter, the methane concentration is increased to above 25 volume percent to thicken the filaments into fibers.

6 Claims, No Drawings

REGULATION OF PYROLYSIS METHANE CONCENTRATION IN THE MANUFACTURE OF GRAPHITE FIBERS

This is a continuation-in-part of U.S. patent application Ser. No. 642,574, filed on Aug. 20, 1984, now abandoned.

BACKGROUND OF THE INVENTION

This is a continuation-in-part of U.S. patent application Ser. No. 642,574, filed on Aug. 20, 1984 now abandoned.

This invention relates to a methane pyrolysis process for manufacturing graphite fibers of a type suitable for filler in plastic composites. More particularly, this invention relates to regulation of reactant methane concentration during sequential stages of fiber growth.

U.S. Pat. No. 4,391,787, issued July 5, 1983 and assigned to the present assignee, describes a method for manufacturing thin, straight graphite fibers by natural gas pyrolysis carried out within a thin-wall stainless steel tube surrounded by wet hydrogen gas. The fibers are preferably 5 to 15 microns in diameter and up to several centimeters long and are well suited for plastic filler. In this process, fiber growth is attributed to a complex interaction between the chromium-bearing steel and methane at elevated temperature. U.S. Pat. No. 4,491,569 describes a method for growing the fibers on a ceramic surface, but only after natural gas pyrolysis is initiated adjacent stainless steel. Stainless steel is relatively expensive and has a limited useful life at fiber growing temperatures. Furthermore, unavoidable carburization of the stainless steel unproductively removes carbon and reduces yield.

Fiber growth is believed to proceed in two sequential stages. During a first stage, pyrolytic carbon interacts with metallic nuclei to form long, thin filaments less than 100 nanometers in diameter. Suitable nuclei are derived from a deposit produced by evaporation of ferric nitrate solution, as described in U.S. patent application Ser. No. 496,482. Once nucleated, the filament grows rapidly in length. However, for reasons not fully understood, the filament then ceases to lengthen. Thereafter, additional pyrolytic carbon thickens the filament into a fiber that is several microns in diameter. It is believed that pyrolysis reactions initiated between the stainless steel and the natural gas in some manner control the nature and the concentration of carbonaceous precursors in the gas stream to favor first filament formation and then thickening.

Therefore, it is an object of this invention to provide an improved process for growing graphite fibers by natural gas pyrolysis on a ceramic surface that does not require that pyrolysis be initiated adjacent stainless steel.

More generally, it is an object of this invention to provide an improved process for growing graphite fibers by pyrolysis of a methane gas, wherein the methane concentration in the gas is regulated first at a value particularly conducive to reactions that nucleate and lengthen filaments and thereafter at a relatively richer value for thickening the filaments into fibers. Although other parameters such as temperature, gas flow rate and nuclei characteristics also affect fiber growth, regulation of the methane concentration during each step improves the overall process by increasing yield, maximizing length and reducing growing time.

SUMMARY OF THE INVENTION

In accordance with a preferred embodiment of this invention, graphite fiber growth on a suitably nucleated ceramic surface by natural gas pyrolysis is improved by regulating the methane concentration in the reactant gas during each stage of the fiber growing process. The growing surface is pretreated by evaporating ferric nitrate solution to deposit an iron compound. A methane gas is passed over the surface while heating at a temperature sufficient to decompose the methane. During an initial period, the gas is formulated by diluting natural gas with hydrogen so that the prepyrolysis methane concentration is between 5 and 15 volume percent. As used herein, methane concentration is designated by reference to the concentration in the formulated gas prior to heating to pyrolytic temperatures, it being understood that pyrolysis reduces the methane concentration by producing other carbonaceous species. This gas stream may commence either while the surface is heating to a predetermined reaction temperature or after the temperature has been achieved. In either event, the iron compound on the growing surface, when exposed to the hydrogen-base gas at elevated temperature, decomposes to form minute ferrous particles that are suitable nuclei. The nuclei react with carbon derived from the methane to produce long, thin cylindrical carbon filaments that project from the surface.

After the filaments have achieved ultimate length, the methane concentration is increased to grow the microscopic filaments radially and form macroscopic fibers. During this step, the gas phase suitably contains at least 25 volume percent methane and is preferably undiluted natural gas. The flow of enriched gas is continued for a time sufficient to grow fibers of a desired diameter, which diameter is preferably 5 to 15 microns for fibers intended for use as plastic filler.

The yield of product fibers is optimized by maximizing the number and length of filaments during the initial step, since the subsequent thickening step does not significantly increase the number or length of the filaments. The reaction of the nuclei and the pyrolytic carbon to grow the filaments depends upon many reaction parameters including temperature and gas flow rate. However, in accordance with this invention, it has been found that the filament-forming reaction is particularly sensitive to the methane concentration in the initial gas. If the methane is too rich, the number and average length of filaments is reduced, presumably because excess carbon prematurely terminates the filament-forming reaction. On the other hand, if the methane concentration is too lean, carbon is not supplied at a rate sufficient to sustain the reactions and achieve maximum length.

In general, a prepyrolysis methane concentration between 5 and 15 volume percent produces abundant filaments of suitable length for forming the product fibers. It is believed that, for a predetermined temperature, there is a specific methane concentration that is particularly conducive to the filament-forming reactions. For example, at 1050° C., the optimum methane concentration is found to be about 11 percent. However, the optimum concentration is sensitive to temperature and other reaction parameters. Further, the temperature and other reaction parameters may vary, for example, even between different regions of a growing surface. In one aspect of this invention, the methane concentration is varied over a range intended to provide an optimum concentration for a plurality of reaction conditions, including temperature fluctuations. Thus, for a reaction temperature within a preferred range between about 1000° C. and 1100° C., the methane concentration may be swept from a value below 10 volume percent to above 12 volume percent, and more preferably from below 9 volume percent to above 13 volume percent.

Once nucleated, filament formation is completed within a short time. Continued exposure to the gas stream containing methane within the range conducive to filament formation does not thicken the filaments at an appreciable rate, even for periods of two hours or more. In accordance with this invention, the methane concentration in the gas stream is increased in a second step to radially enlarge the filaments into fibers. The diameter of the product fibers is related to the duration of this second step. However, the length is not significantly increased. In general, a concentration greater than about 25 percent thickens the fibers at a suitable rate. Higher methane concentrations are preferred to maximize the rate of carbon deposition and thereby to minimize the time required to achieve a desired diameter. Thus, regulation of the methane concentration in accordance with this invention not only maximizes the number and length of precursor filaments, and thus the yield and length of product fibers, but also reduces the time required to produce fibers of a particular diameter, thereby reducing the overall reaction time.

DETAILED DESCRIPTION OF THE INVENTION

The method of this invention is illustrated by the following examples.

EXAMPLE I

Graphite fibers were grown within a cylindrical tubular mullite reactor having a gas inlet at one end and a gas outlet at the opposite end. A longitudinal midsection of the reactor was enclosed within a coaxial cylindrical furnace such that the reactor ends extended beyond the furnace for making gas line connections thereto. The furnace had a helical electrical resistance heating element encompassing the midsection for heating the midsection to reaction temperature. The reactor inner diameter was about 52 millimeters. The midsection within the furnace was about 70 centimeters.

Fibers were grown on an alumina coupon inserted into the reactor midsection such that a surface of the coupon was exposed to the gas therein. Prior to insertion, the coupon surface was pretreated by applying a 1.5 M aqueous ferric nitrate solution and drying to deposit an iron salt thereon.

A mixture of natural gas and dry hydrogen was delivered to the reactor through the inlet. Gas was exhausted from the reactor outlet, thereby establishing a gas stream through the reactor at slightly above atmospheric pressure. Bottled natural gas was employed from Airco, Inc. under the designation methane grade 1.3 and was about 96 volume percent methane. The flow rate of natural gas through the reactor was adjusted to 48 cubic centimeters per minute (cc/min). The hydrogen flow rate was adjusted to about 452 cc/min. Thus, the methane concentration in the gas stream was estimated to be about 9.2 volume percent.

After air had been purged from the reactor, the furnace was heated, whereupon the reactor midsection and the gas therein was heated at a rate of about 7° C. per minute to a temperature of 1130° C. and maintained at that temperature. The flow of the 9.2 percent methane gas was continued for about one hour. Thereafter, the natural gas flow rate through the reactor was increased to 380 cc/min and the hydrogen flow rate was increased to 995 cc/min, so that the methane concentration was increased to about 28 volume percent. After about one hour, the furnace was shut off and the reactor was cooled to room temperature. Although gas flow was discontinued during cooling, the reactor was not opened to air to avoid oxidation of the hot fibers. An abundance of graphite fibers was found on the coupon surface. The average fiber length was about 1.5 centimeters, although numerous fibers as long as about 3 centimeters were found. The average diameter was about 10 microns. The fibers were considered comparable to those described in U.S. Pat. No. 4,391,787 and were suitable for use as plastic filler.

EXAMPLE II

The tubular mullite reactor and the electrical furnace were similar to Example I except that the reactor inner diameter was 19 millimeters and the heated midsection was about 30 centimeters long. An air-purgable antechamber was provided adjacent the reactor outlet for introducing the coupon into the reactor while avoiding air contamination. The reactor was heated to about 1050° C. while passing argon gas therethrough. After the reaction temperature had been achieved, the alumina coupon was inserted into the hot zone of the reactor from the antechamber. The coupon surface had been doped using 0.15 M ferric nitrate solution in a manner similar to Example I. After the coupon was positioned near the middle of the reactor hot zone, argon gas flow into the reactor was discontinued, and the flow of a dilute methane gas was initiated. Methane of high purity was premixed with, by volume, 1 percent nitrogen and 2 percent ethane to produce a formulation representative of commercial grade natural gas, but having a controlled composition to permit evaluation of the method of this invention without concerns for variations in commercial natural gas composition. The synthesized natural gas flowed into the reactor at about 4.4 cc/min and was diluted by hydrogen introduced at a rate of about 35.6 cc/min. Thus, the methane concentration in the gas stream was estimated to be about 10.7 volume percent. This gas flow was continued for about 20 minutes, which time was deemed sufficient to permit filaments to sprout and grow to maximum length. Thereafter, the flow of hydrogen through the reactor was discontinued, and the flow rate for the synthesized natural gas was increased to about 40 cc/min for about 40 minutes. Gas flow through the reactor was then discontinued and the reactor was cooled. Examination of the coupon revealed an abundance of graphite fibers having an average fiber length of about 4 millimeters and an average diameter of about 10 microns.

EXAMPLE III

In this example, the prepyrolysis methane concentration in the gas stream was varied during the filament-forming stage over a suitable range to optimize fiber growth despite variations in reaction conditions.

The apparatus and method were substantially as in Example II except for the following differences. The coupon surface was doped with 0.1M ferric nitrate solution. After the reactor had been heated to about 1050° C., the flow of dilute methane gas was commenced. Initially, the gas entering the reactor consisted of 3.6 cc/min synthesized natural gas and 36.4 cc/min hydrogen, corresponding to a methane concentration of about 8.7 percent. The gas formulation was varied over a period of about one-half hour by uniformly increasing the natural gas flow rate and concurrently decreasing the hydrogen flow rate, so that the total gas flow rate remained substantially constant. After one-half hour, the gas flowing into the reactor consisted of 5.4 cc/min natural gas and 34.6 cc/min hydrogen, corresponding to a methane concentration of about 13.1 volume percent. Thereafter, the natural gas was passed undiluted into the furnace at a rate of about 40 cc/min for about 15 minutes. The product fibers were approximately 3 to 4 microns in diameter.

EXAMPLE IV

Example III was repeated, except that during the filament-forming step the initial gas consisted of 4 cc/min synthesized natural gas and 36 cc/min hydrogen, corresponding to a prepyrolysis methane concentration of 9.7 volume percent. The gas composition was uniformly adjusted to 4.8 cc/min natural gas and 35.2 cc/min hydrogen over one-half hour. Thereafter, undiluted natural gas was flowed into the furnace to produce the fibers.

As illustrated in these examples, the method of this invention comprises a preferred first step during which methane diluted with hydrogen interacts with the ferric nitrate deposit to form thin, long microscopic filaments. At the elevated temperature, the hydrogen-base gas is believed to reduce the ferric nitrate deposit and form minute iron particles. These particles interact with pyrolytic carbon to grow the filaments. Hydrogen is preferred for the diluent to assist in reducing the ferric nitrate deposit. Also, since hydrogen is also a major byproduct of methane pyrolysis, the presence of a large hydrogen proportion may aid in regulating methane pyrolysis in accordance with well known chemical principles to prevent uncontrolled sooting.

Once nucleated, the filaments lengthen at a very rapid rate. However, this lengthening ceases after only a short time for reasons that are not fully understood. It is believed that filament formation is substantially completed within a few minutes, although the first step is preferably extended to assure maximum opportunity for filament growth.

The filaments formed in the first step have submicron diameters, but are thickened into fibers in a subsequent step. Thus, each product fiber is derived from a filament, although only a fraction of the total number of filaments resists breakage and is suitably oriented and lenthened so as to mature into fibers. Since the thickening step does not significantly add to the length or produce additional fibers, it is useful to consider the yield of fibers as being the total length of fibers per growing surface area, which in turn is related to the population and length of the precursor filaments. It has been found that the methane concentration during the filament-forming step critically affects the fiber yield.

The optimum methane concentration depends upon the reaction temperature. At 1050° C., the prepyrolysis methane concentration that produces an optimum fiber yield is about 11 volume percent. Deviation from the optimum value reduces yield but may produce suitable results. In Example II, the reaction temperature was held constant throughout the fiber growing process. Example II was repeated at different reaction temperatures, while varying methane concentration to determine the optimum concentration at each temperature. At 1000° C., the optimum methane concentration was found to be about 12.5 volume percent. At 1100° C., the optimum was about 8 volume percent. At 1150° C., the optimum was about 5.5 volume percent. Above 1200° C. and below 950° C. few fibers were formed under the conditions of Example II. In general, a methane concentration between about 5 and 15 volume percent produces precursor filaments sufficient to form a high density of suitably long fibers.

The practice of this invention is not limited to maintaining a constant prepyrolysis methane concentration during the filament formation step, but may advantageously be carried out by varying the methane concentration over a suitable range to obtain optimum fiber yield despite fluctuations in temperature or differences in other reaction conditions. Reaction conditions may vary not only over the time of the reaction, but also between different regions within the reactor. At 1050° C., it is believed that filament growth is optimized using about 11 volume percent methane, as in Example II. However, a high yield of fibers may be obtained with methane concentrations within a preferred range between 9 and 13 volume percent. Thus, as illustrated in Example III, the methane concentration may be gradually increased to sweep over the preferred range. The prepyrolysis methane concentration may be adjusted initially to a value of less than 9 percent and gradually increased to a value greater than 13 percent. Alternately, the methane concentration may be suitably swept over a narrower range from below to above the optimum methane concentration, as in Example IV. The rate at which the methane concentration is increased is suitably slow to permit filaments to form, which occurs rapidly when optimum conditions are achieved. In general, sweeping the methane concentration over a period of time of between about 10 and 30 minutes is sufficient.

Preferred conditions comprise a temperature between about 1000° C. and 1100° C. and a methane concentration between about 8 and 13 volume percent. Although Example II comprises isothermal reactions, it is believed that filaments may be formed at temperatures as low as about 600° C., although such low temperatures evidently are not sufficient to thicken the filaments. Thus, commencing methane gas flow during warm-up, as in Example I, may accelerate filament formation, particularly since the filament lengthening reaction may be favored at lower temperatures. It has been found that fibers grow within the reactor after the gas has been heated at the reaction temperature 10 to 20 seconds. Optimum growth occurs after the gas is heated for about 15 seconds.

The relatively low methane concentration employed in the first step to promote filament formation is not sufficient to enlarge the filaments radially at a rate sufficient to form the fibers within a practical time. In Example II, continued exposure to 10.7 volume percent methane gas at 1050° C. for times as long as two hours does not significantly increase the diameter. Thus, the method of this invention comprises a second step wherein methane concentration in the gas stream is increased. At this increased concentration, pyrolysis produces abundant carbonaceous species that suitably deposit on the peripheral surfaces to thicken the filaments into fibers. In general, it is found that a methane concentration greater than about 25 volume percent thickens at an appreciable rate. However, it is preferred to maximize the methane concentration in the gas phase, for example, by using undiluted natural gas, to improve efficiency and maximize the radial growth rate. For a particular methane concentration in the second step, it is believed that the average diameter of the product fibers increases linearly as a function of time, so that the diameter is conveniently determined by the duration of the second step. In general, fiber diameters of between 5 and 100 microns are suitable for plastic filler, with fibers having diameters between 5 and 15 microns being preferred.

The rate at which filaments thicken into fibers is also dependent upon other reaction parameters including temperature and flow rate. In general, the flow rate may be increased during the second step to increase the rate at which pyrolytic carbon is supplied to the growing surface. Also, while temperatures as low as 600° C. are suitable for forming filaments, temperatures near 1200° C. or higher enhance the thickening reactions.

In the described embodiments the ceramic surface was initially doped with ferric nitrate solution. It is believed that ferric nitrate deposit decomposes at moderately elevated temperatures to a mixture of iron oxides, which iron oxides thereafter further decompose at elevated temperatures in the presence of a hydrogen-base reducing gas to form metallic nuclei suitable for forming filaments. However, nuclei derived from other sources may be substituted. For example, fibers have been grown using nuclei derived from submicron magnetite particles. Also, iron particles derived from thermal decomposition of iron carbonyl produce fibers. Iron particles having diameters less than 0.1 micron are commercially available and are suitable nuclei.

While this invention has been described in terms of certain embodiments thereof, it is not intended to be limited to the above description, but only to the extent set forth in the claims that follow.

The embodiments of the invention in which an exclusive property or privilege is claimed are defined as follows:

1. A methane pyrolysis process for growing graphite fibers on a suitably nucleated ceramic surface, said process comprising flowing a hydrogenbase gas comprising about 5 to 15 volume percent methane over said surface while heating to decompose the methane to form microscopic carbon filaments that project from the surface, and thereafter flowing a gas containing greater than 25 volume percent methane over said surface while heating to decompose the methane to thicken the filaments into fibers.

2. A methane pyrolysis process for manufacturing graphite fibers by growing the fibers on a surface of a ceramic substrate bearing suitable iron-base nuclei, said process comprising
    flowing a hydrogen gas stream comprising a prepyrolysis methane concentration between about 5 and 15 volume percent over the surface while heating to a temperature between about 600° C. and 1200° C. to decompose the methane in the gas stream and grow microscopic elongated carbon filaments on the surface that project therefrom, and thereafter
    passing a gas stream comprising a prepyrolysis methane concentration greater than 25 volume percent over said surface while heating at a temperature between about 950° C. and 1200° C. to decompose the methane in the gas stream and thicken the filaments into fibers.

3. A methane pyrolysis process for manufacturing graphite fibers by growing the fibers on a surface of a ceramic substrate bearing an iron oxide deposit reducible to form suitable iron-base nuclei, said process comprising
    flowing a gas stream formed by diluting natural gas with hydrogen over the surface while heating between about 950° C. and 1200° C. to decompose the methane in the gas stream and grow microscopic elongated carbon filaments on the surface that project therefrom, said gas stream having a prepyrolysis methane concentration between about 5 and 15 volume percent, and thereafter
    passing a gas stream comprising natural gas and having a prepyrolysis methane concentration above 25 volume percent over said surface while continuing to heat at a temperature within said range for a time sufficient to thicken the filaments into fibers.

4. A natural gas pyrolysis process for manufacturing graphite fibers by growing the fibers on a surface of a ceramic substrate bearing an iron oxide deposit of the type formed by evaporation of a ferric nitrate solution, said process comprising
    passing a gas stream over the growing surface while heating to a methane pyrolysis temperature, said gas stream initially comprising methane from a natural gas source and diluted with hydrogen to a concentration between about 8 and 13 volume percent, said gas stream and growing surface being heated at a temperature between about 1000° C. and 1100° C., whereupon carbon derived from the methane interacts with iron-base nuclei derived from the iron oxide to form carbon filaments that project from the surface, and
    passing a substantially undiluted natural gas stream in contact with the filament-bearing surface at a temperature within said range and continuing for a time sufficient to radially grow the filaments into fibers having diameters between about 5 and 15 microns.

5. A methane pyrolysis process for manufacturing graphite fibers and comprising passing a methane-containing stream over a suitably nucleated ceramic surface while heating the gas at a temperature sufficient to decompose the methane to form carbon filaments that project from said surface and thereafter thicken the filaments into the product fibers, said process further comprising
    initially passing over said surface a predominantly hydrogen gas stream having a prepyrolysis methane concentration less than the optimum filament-forming concentration for said temperature,
    gradually increasing the prepyrolysis methane concentration in said gas stream to above the optimum filament-forming concentration for said temperature over a time sufficient to form said filaments, and
    thereafter further increasing the prepyrolysis methane concentration in said gas stream to above 25 volume percent to thicken the filaments into the fibers.

6. A methane pyrolysis process for manufacturing graphite fibers by growing the fibers on a ceramic surface bearing a suitable iron nuclei, said process comprising passing a methane-containing gas stream over the surface while heating at a predetermined temperature between about 1000° C. and 1100° C. to decompose the methane, said process further comprising
- initially passing a gas stream over the surface that comprises a natural gas source blended with hydrogen and having a prepyrolysis methane concentration less than 9 volume percent,
- gradually increasing the methane concentration in said stream to a prepyrolysis concentration above 12 volume percent over a period of between 10 and 30 minutes, whereupon nascent carbon interacts with the iron nuclei derived from said iron oxide to form carbon filaments that project from the surface, and thereafter
- passing a substantially undiluted natural gas stream in contact with the filaments on said surface for a time sufficient to radially grow the filaments into fibers having diameters between about 5 and 15 microns.

* * * * *

UNITED STATES PATENT AND TRADEMARK OFFICE
CERTIFICATE OF CORRECTION

PATENT NO. : 4,565,684

DATED : January 21, 1986

INVENTOR(S) : Gary G. Tibbetts, Michael G. Devour

It is certified that error appears in the above-identified patent and that said Letters Patent is hereby corrected as shown below:

Column 1, lines 6-9, delete "This is a continuation-in-part of U.S. patent application Ser. No. 642,574, filed on Aug. 20, 1984, now abandoned."

Column 1, lines 41-42, delete "U.S. patent application Ser. No. 496,482" and insert -- U.S. Patent No. 4,491,569 --.

Column 7, line 46, delete "hydrogenbase" and insert -- hydrogen-base --.

Signed and Sealed this

Twenty-seventh Day of May 1986

[SEAL]

Attest:

DONALD J. QUIGG

Attesting Officer

Commissioner of Patents and Trademarks